United States Patent Office 2,878,239
Patented Mar. 17, 1959

2,878,239

POLYVINYL CHLORIDE PURIFICATION PROCESS

William A. McMinn, Jr., Brookline, and John T. Barr, Needham, Mass., assignors to Escambia Chemical Corporation, Pace, Fla., a corporation of Delaware No Drawing. Application November 9, 1956
Serial No. 621,190

6 Claims. (Cl. 260—92.8)

This invention relates to the production of chemicals and in particular to the production of vinyl chloride polymers.

A principal object of the present invention is to provide a novel method for purifying vinyl chloride polymers.

Another object of the invention is to provide a method of the above type whereby the purified polymer therefrom may be formed into plasticized films or sheets having few, if any, fish eyes.

Other objects of the invention will in part be obvious and will in part appear hereinafter.

The invention accordingly comprises the method involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed description.

Vinyl chloride polymers have found many desirable applications. For example, vinyl chloride polymer compositions can be used in electric wire and cable coverings, shower curtains, table cloths, rain wear, tubing, upholstery material and other applications too numerous to enumerate. One of the most successful uses for vinyl chloride polymers has been in the manufacture of sheeting or films. Due to the transparency of the sheeting it is necessary for most applications that the sheeting be substantially free of imperfections which are known in the plastics trade as "fish eyes." Fish eyes may be regarded as small particles of vinyl chloride polymer in the sheet which have not blended properly and uniformly with the surrounding material. The presence of fish eyes in film and sheeting is very undesirable since it affects the physical properties and appearance of the sheeting. The present invention is directed to a novel method of purifying vinyl chloride polymers produced by any of the well-known polymerization processes. The refined vinyl chloride polymers by this invention have been found to give plasticized sheets free of fish eyes.

In the polymerization of vinyl chloride, particularly by suspension techniques, it has been found that the polymeric material obtained frequently contains or is made up of several distinct types of masses. The greatest portion, or essentially all, of the polymeric material obtained consists of polyvinyl chloride which readily accepts plasticizers and fuses under heat to give unblemished sheet. The remainder of the polymeric material obtained, which is very small in weight quantity, is often found to consist of polyvinyl chloride gels or polyvinyl chloride gel cores. These imperfections cannot take up adequate plasticizer due to their character and thus cannot be blended into the remainder of the polyvinyl chloride mass to give a homogeneous composition. The result is, of course, the presence of fish eyes in the plasticized mass. In order to prepare fish-eye free plasticized materials, the gel-containing polymers must be removed from the vinyl chloride polymer masses. This may be readily and easily accomplished by utilizing the difference in the specific gravities of the polymer masses involved. Polyvinyl chloride has a specific gravity of about 1.40 whereas the gel-containing impurities have somewhat higher specific gravities of the polymer masses involved. Polyvinyl chloride has a specific gravity of about 1.40 whereas the gel-containing impurities have somewhat higher specific gravities. In the present invention, vinyl chloride polymer masses to be purified or refined are treated with an aqueous salt solution having a specific gravity similar to the specific gravity of pure polyvinyl chloride. This results in having pure polyvinyl chloride float at the top of the aqueous salt solution while the higher specific gravity impurities settle out at the bottom of the solution. The purified polyvinyl chloride can then be easily separated from the solution, suitably dried, plasticized and calendered or extended fish-eye free. In one preferred embodiment of the invention, a wetting agent is employed with the aqueous salt solution to insure good wetting of the polymer. In general any wetting agent can be employed which is compatible and non-reactive with the other constituents of the mixture. Surface active agents such as the sodium sulfonates of aliphatic or alkyl aromatic hydrocarbons, the partial esters of hexitol anhydride, and other wetting agents such as shown in the "Journal of Industrial and Engineering Chemistry," vol. 35, pp. 107–117, 1943, are suitable for use in the instant invention.

Specific detailed methods of practicing the present invention are set forth in the following non-limiting examples.

Example I

Five hundred cc. of a saturated aqueous solution of calcium chloride were charged to a suitable vessel. This solution had a specific gravity of about 1.40. 200 grams of polyvinyl chloride were added to the solution along with approximately 0.05 part of a suitable wetting agent such as Span 60 (a partial ester of hexitol anhydride) to insure good wetting of the polymer. Only a small amount of solid material settled out while the remainder floated at the top of the solution. In order to insure complete removal of impurities, sufficient water was added to the solution to slightly lower the specific gravity of the solution (to about 1.36) and to cause settling out a total of about 5 percent of the added polyvinyl chloride. The settled polymeric material and that which remained floating were separately recovered and dried.

The refined polyvinyl chloride (that which remained floating) after drying was plasticized and milled into conventional sheeting. No fish eyes were discernible in this sheeting.

The polyvinyl chloride containing the impurities (that which had settled) was likewise plasticized and milled into conventional sheeting. This sheet containing approximately 30 fish eyes per square inch.

Example II

Five hundred cc. of a saturated solution of calcium chloride were charged to a suitable vessel. This solution had a specific gravity of approximately 1.40. 200 grams of polyvinyl chloride obtained directly from a reactor (the water having been removed by centrifuging but no working or drying as yet had been attempted) along with approximately 0.05 part of a suitable wetting agent such as Span 60 were added to the solution. Sufficient water was added to effect settling of approximately 5 percent of this material. That which floated and that which settled were recovered, washed and dried separately.

Again the refined polyvinyl chloride (that which floated) and the impure polyvinyl chloride (that which settled) were plasticized and milled into conventional sheeting. As in Example I, no fish eyes were discernible in the sheeting prepared from the refined polyvinyl chloride while the sheeting prepared from the impure polyvinyl chloride contained approximately 11 fish eyes per square inch.

*Example III*

Five hundred cc. of a saturated aqueous solution of sodium bisulfite were charged to a suitable vessel. This solution had a specific gravity of about 1.37. 200 grams of polyvinyl chloride were added to the solution along with approximately 0.05 part of a suitable wetting agent such as Span 60 to insure good wetting of the polymer. Only a small amount of solid material settled out while the remainder floated at the top of the solution. In order to insure complete removal of impurities, sufficient water was added to the solution to slightly lower the specific gravity of the solution and to cause settling out a total of about 5 percent of the added polyvinyl chloride. The settled polymeric material and that which remained floating were separately recovered and dried.

The refined polyvinyl chloride (that which remained floating) after drying was plasticized and milled into conventional sheeting. No fish eyes were discernible in this sheeting.

The polyvinyl chloride containing the impurities( that which had settled) was likewise plasticized and milled into conventional sheeting. This sheet contained approximately 30 fish eyes per square inch.

Specific gravity is usually defined as the ratio of the weight of any volume to the weight of an equal volume of water taken as the standard at the same temperatures. Water is given a specific gravity of 1.0. Polyvinyl chloride has a specific gravity of about 1.40. If such polyvinyl chloride were added to water containing a suitable wetting agent to insure good wetting of the polymer, it would settle out since the specific gravity thereof is greater than that of the water. However, if there is used an aqueous salt solution having a specific gravity at least equal to or greater than that of polyvinyl chloride and also containing a suitable wetting agent, then the polyvinyl chloride will float at the top of the solution. The present invention utilizes the differences between the specific gravities of polyvinyl chloride and polymer impurities to effect a very selective and excellent separation.

The small quantities of polymer impurities found to be associated with or present in vinyl chloride polymer production have a specific gravity somewhat higher than that of pure polyvinyl chloride, i. e. above 1.40. Thus it is preferable to employ an aqueous salt solution with a specific gravity which will permit the polyvinyl chloride to float thereon while at the same time causing the higher specific gravity impurities to settle out. In addition to calcium chloride and sodium bisulfite solutions, any aqueous solution with the desired specific gravity and which does not decompose may also be used. Aqueous solutions of cadmium nitrate, chromium sulfate, ammonium nitrate, aluminum chloride, cupric chloride, ferric chloride, nickel chloride, nickel nitrate, ferric nitrate, ferric sulfate, potassium iodide, sodium silicate, potassium carbonate, zinc chloride, sucrose (cane sugar) and stannous chloride are also suitable. The specific gravity of such solutions can be varied such that as high as 50 percent of the added vinyl chloride polymer can be forced to settle out. This assures complete removal of all impurities. However, it has been found that a very high purity polyvinyl chloride can be obtained by causing to settle out no more than about 5 percent by weight of the vinyl chloride polymer to be purified.

In order to secure a very selective and good separation, it is preferable that a suitable wetting agent be present or added to the aqueous salt solution. The wetting agent insures a good wetting of the vinyl chloride polymer and thus makes it more sensitive to variations in the specific gravity of the aqueous salt solutions. Small amounts of suitable wetting agents such as the Spans (partial esters of hexitol anhydride), di(2-ethylhexyl) ester of sodium sulfosuccinic acid, sodium butyl naphthalene sulfonate, sodium lauryl sulfate, sodium isopropyl naphthalene sulfonate, sodium decyl benzene sulfonate and others well known in the art can be effectively employed.

The purification, which is preferably carried out at room temperature, may be accomplished in several ways. For example, in suspension polymerizations the vinyl chloride polymers upon termination of the agitation settle out of the aqueous medium. A suitable quantity of salt such as sodium bisulfite can be added directly to the final reaction mixture, to produce an aqueous salt solution having a specific gravity of about 1.40 or somewhat lower depending on how much polymer it is desired to have settle out. This can also be carried out in a stepwise manner. For example, a salt solution with a suitable specific gravity can be added to the vinyl chloride polymer to be purified to initially produce an aqueous salt solution with a specific gravity of about 1.40. The polymer which settles out of this solution can be removed if desired before any additional polymer settling out step is accomplished. This has the advantage of being able to remove the most impure polyvinyl chloride first. Thus grading of polyvinyl chloride can be effected.

In addition to adding a suitable salt or aqueous salt solution to polyvinyl chloride as produced or in dry form, it is also possible to reverse the procedure. For example, polyvinyl chloride can be added to a suitable aqueous salt solution as shown in the examples. The aqueous salt solution can have a specific gravity of about 1.40 or somewhat lower depending on how much polymer it is desired to have settle out. Again a two step procedure can be utilized. For example, the polyvinyl chloride can be added to a salt solution having a specific gravity of about 1.40. The polymer which settles out can be removed if desired. Any additional polymer settling is accomplished by lowering the specific gravity of the solution. This is very easily done by merely adding suitable quantities of water to the solution. How much polymer it is desired to have settle out will govern how much water is to be added to lower the specific gravity of the salt solution.

The polymer impurities which settle out of the aqueous salt solution can be recovered, dried and utilized in applications where the presence of fish eyes is not detrimental. The refined polyvinyl chloride, after recovery, is dried and utilized in applications where the presence of fish eyes is undesirable. As shown in the examples, the refined polyvinyl chloride obtained according to the present invention produces plasticized transparent sheets containing no discernible fish eyes.

Since certain changes may be made in the above process without departing from the scope of the invention herein involved, it is intended that all matter contained in the above description shall be interpreted as illustrative and not in a limiting sense.

What is claimed is:

1. The method of purifying polyvinyl chloride prepared by suspension polymerization which comprises treating said polyvinyl chloride with an aqueous salt solution having a specific gravity of about 1.40, and recovering pure polyvinyl chloride from the top of said aqueous salt solution.

2. The method of purifying polyvinyl chloride prepared by suspension polymerization which comprises treating said polyvinyl chloride with an aqueous salt solution having a specific gravity of between about 1.36 and about 1.40 to settle less than about 5 percent by weight of the polyvinyl chloride from said solution, recovering the settled polyvinyl chloride from the bottom of said aqueous salt solution and pure polyvinyl chloride from the top of said aqueous salt solution.

3. The method of purifying polyvinyl chloride prepared by suspension polymerization which comprises treating said polyvinyl chloride with an aqueous salt solution having a specific gravity of about 1.40, adding sufficient water to said solution to lower the specific gravity thereof and to cause less than about 5 percent by weight of the polyvinyl chloride to settle from said solution, recovering the settled polyvinyl chloride from the bottom of said aqueous salt solution and pure polyvinyl chloride from the top of said aqueous salt solution.

4. The method of purifying polyvinyl chloride prepared by suspension polymerization which comprises treating said polyvinyl chloride with a wetting agent and an aqueous salt solution having a specific gravity of about 1.40, and recovering pure polyvinyl chloride from the top of said aqueous salt solution.

5. The method of purifying polyvinyl chloride prepared by suspension polymerization which comprises treating said polyvinyl chloride with a wetting agent and an aqueous salt solution having a specific gravity of about 1.40, adding sufficient water to said solution to lower the specific gravity thereof and to cause less than about 5 percent by weight of the polyvinyl chloride to settle from said solution, recovering the settled polyvinyl chloride from the bottom of said aqueous salt solution and pure polyvinyl chloride from the top of said aqueous salt solution.

6. The method of purifying polyvinyl chloride prepared by suspension polymerization which comprises treating said polyvinyl chloride with a wetting agent and an aqueous salt solution having a specific gravity of between about 1.36 and about 1.40 to settle less than about 5 percent by weight of the polyvinyl chloride from the solution, recovering the settled polyvinyl chloride from the bottom of said aqueous salt solution and pure polyvinyl chloride from the top of said aqueous salt solution.

References Cited in the file of this patent

UNITED STATES PATENTS

| | | |
|---|---|---|
| 2,373,347 | Schoenfeld | Apr. 10, 1945 |
| 2,495,147 | Street | Jan. 17, 1950 |
| 2,528,469 | Condo et al. | Oct. 31, 1950 |

UNITED STATES PATENT OFFICE
CERTIFICATE OF CORRECTION

Patent No. 2,878,239                                          March 17, 1959

William A. McMinn, Jr. et al.

It is hereby certified that error appears in the printed specification of the above numbered patent requiring correction and that the said Letters Patent should read as corrected below.

Column 2, line 6, after "gravities" insert a period; same line, beginning with "of the polymer masses" strike out all to and including "gravities." in line 9, same column.

Signed and sealed this 14th day of July 1959.

(SEAL)
Attest:

KARL H. AXLINE
Attesting Officer

ROBERT C. WATSON
Commissioner of Patents